C. W. OBERREICH.
TOY.
APPLICATION FILED SEPT. 16, 1919.
1,336,374.
Patented Apr. 6, 1920.
2 SHEETS—SHEET 1.
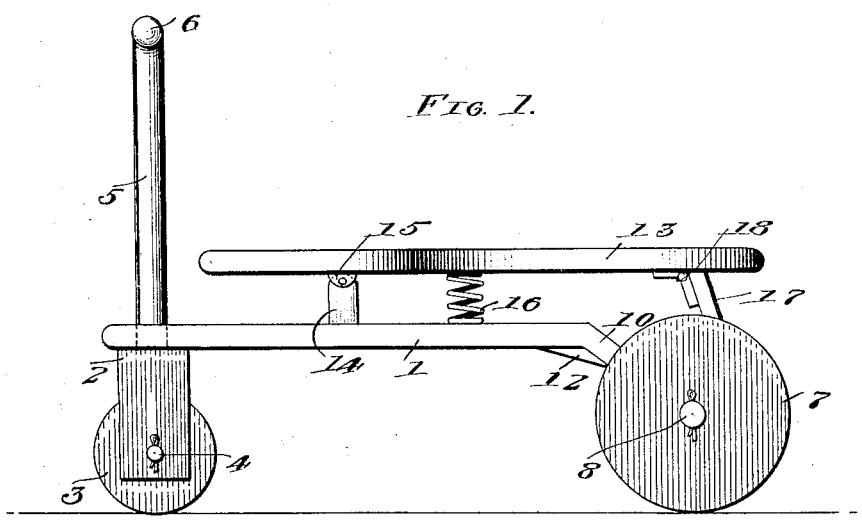
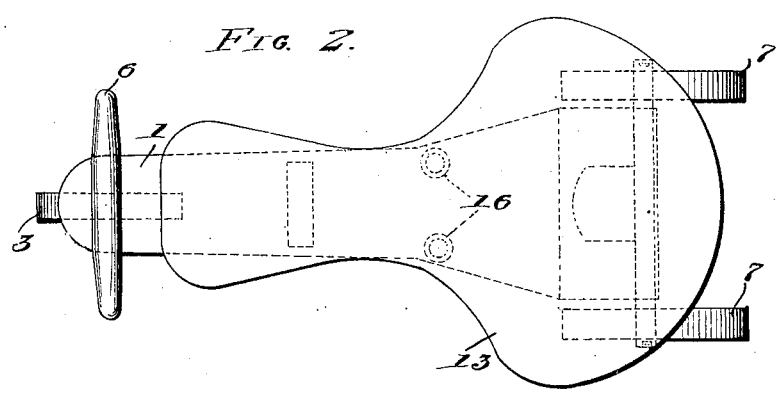
WITNESSES
INVENTOR
CHAS. W. OBERRETCH,
BY
ATTORNEYS C. W. OBERREICH.
TOY.
APPLICATION FILED SEPT. 16, 1919.
1,336,374.
Patented Apr. 6, 1920.
2 SHEETS—SHEET 2.
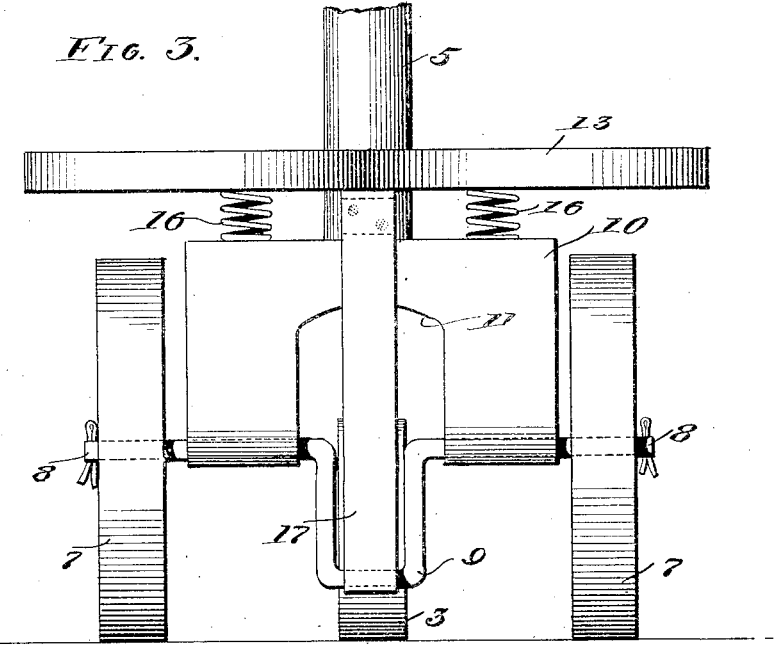
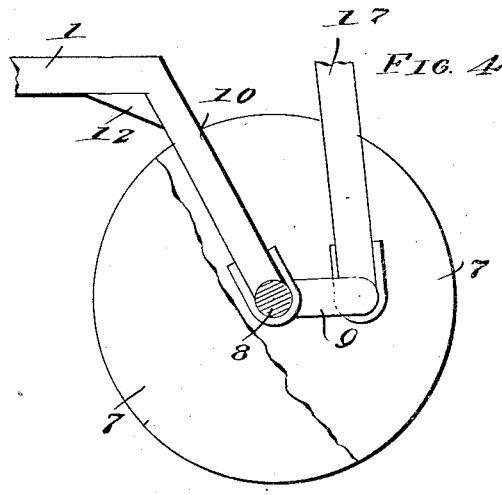
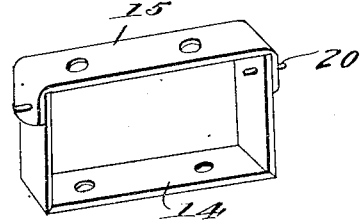
WITNESSES
INVENTOR
CHAS. W. OBERREICH,
BY
ATTORNEYS

UNITED STATES PATENT OFFICE.

CHARLES WILLIAM OBERREICH, OF BUCYRUS, OHIO.

TOY.

1,336,374.     Specification of Letters Patent.     Patented Apr. 6, 1920.

Application filed September 16, 1919. Serial No. 324,102.

*To all whom it may concern:*

Be it known that I, CHARLES WILLIAM OBERREICH, a citizen of the United States, and a resident of Bucyrus, in the county of Crawford and State of Ohio, have invented certain new and useful Improvements in Toys, of which the following is a specification.

My invention is an improvement in toys, and has for its object to provide a wheeled vehicle, wherein a body is provided on which the wheels are journaled and having means for steering the same, together with a seat rockably connected with the body and normally spring supported, and connected to the wheels in a manner to cause the seat to be rocked when the vehicle is propelled by the feet of the user to simulate the rising and falling movement of a horse.

In the drawings:

Figure 1 is a side view of the improved toy,

Fig. 2 is a top plan view,

Fig. 3 is a rear view,

Fig. 4 is a sectional detail view showing one of the rear wheels and the connection between the auxiliary seat and the rear axle, Fig. 5 is a perspective view of the hinge connecting the seat and body.

In the present embodiment of the invention the improved toy is a vehicle comprising a body 1 having pivoted to the front thereof a yoke 2, between whose arms the front wheel 3 is journaled, the said wheel having an axle 4 which is held in the arms of the yoke. A steering post 5 is connected to the body of the yoke, and is journaled on the body of the vehicle, the said post having a cross head 6 at its upper end for turning the same.

The rear end of the body is supported by wheels 7 which are secured to the ends of an axle 8 having at its center a crank 9. This axle is journaled in bearings in a bolster 10 secured to the body at the rear thereof, the said bolster having a central notch or recess 11 on its lower edge for permitting the passage of the crank 9.

Referring to Fig. 4 it will be seen that the bolster 10 is inclined forwardly toward its connection with the body 1 of the vehicle, and that a brace 12 is arranged between the body and the bolster.

A seat 13 is mounted above the body, the said seat being saddle shaped as shown more particularly in Fig. 2, and the seat extends from near the steering post to above the rear axle. This seat is supported at its front end by hinge mechanism to be described, and it is normally spring supported in a plane approximately parallel with the plane of the body by a coil spring 16 arranged between the body and the seat. A link or pitman 17 connects the rear of the seat with the crank 9, the pitman being hinged to the seat as indicated at 18, and being journaled on the crank.

The hinge connection between the body and the seat, as shown in Fig 5 consists of two substantially U-shaped members 14 and 15. The bodies of these members have openings for screws or the like to connect them to the body and seat respectively, and the arms of the members overlap and are connected by rivets 20 as shown. Thus the front end of the seat is supported above the body in spaced relation and is hinged to the body.

In use, the child sits upon the seat, and propels the vehicle with his or her feet, steering the vehicle by the cross head 6. As the vehicle moves, the rear axle 8 is rotated, and a reciprocating or vibrating movement is imparted to the rear of the seat, simulating the rising and falling movement of a horse.

I claim:

A device of the character described comprising an elongated platform, a dirigible steering wheel mounted therebelow, rear wheels journaled at the rear end of the platform, a support rising from said platform intermediate the ends thereof, a seat disposed above and normally in spaced parallel relation to said platform, said seat being pivotally connected at a point spaced from its forward end with said support, coil springs interposed between the platform and the seat, and means connected with the rear wheels for imparting a rocking up and down motion of said seat, the location of the seat in spaced relation to the platform preventing contact therewith.

CHARLES WILLIAM OBERREICH.